Jan. 17, 1967  E. G. GRESSMAN ETAL  3,298,396
BACKWASH AND REGENERATION VALVE FOR WATER CONDITIONING SYSTEM
Filed May 1, 1964
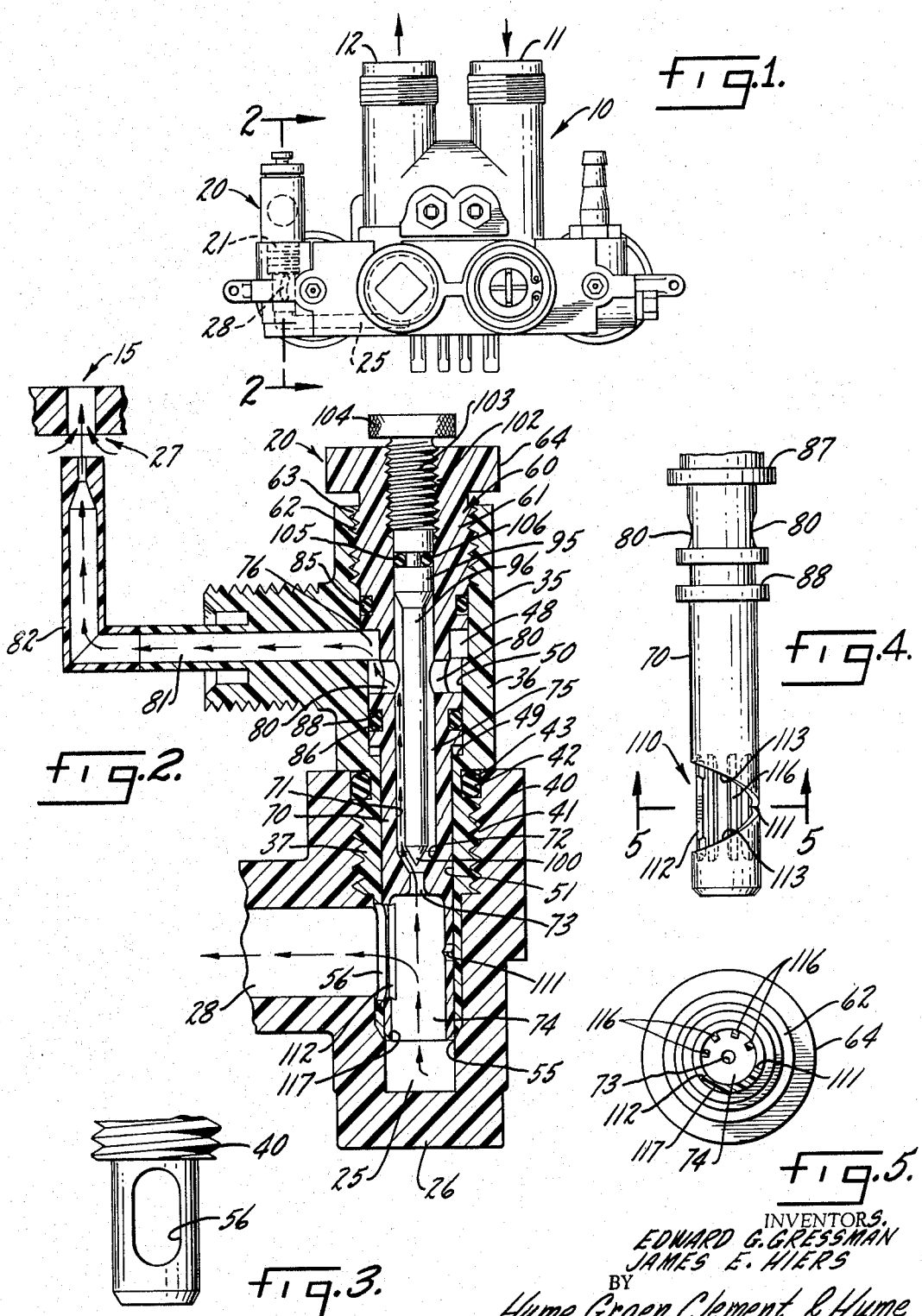
INVENTORS.
EDWARD G. GRESSMAN
JAMES E. HIERS
BY
Hume, Groen, Clement & Hume
Attorneys.

United States Patent Office 3,298,396
Patented Jan. 17, 1967

3,298,396
BACKWASH AND REGENERATION VALVE FOR WATER CONDITIONING SYSTEM
Edward G. Gressman and James E. Hiers, St. Paul, Minn., assignors to Union Tank Car Company, Chicago, Ill., a corporation of New Jersey
Filed May 1, 1964, Ser. No. 364,121
11 Claims. (Cl. 137—637.4)

This invention is in the field of water conditioning. It relates specifically to the regulation of water flow in a water conditioning system.

It is an object of the present invention to provide improved control of water flow in a water conditioning system.

It is another object to provide precise control of water flow to backwash and the regeneration fluid draw in a water conditioning system.

It is yet another object to provide a unitary auxiliary valve assembly which affords separate, precise control of water flow to backwash and the regeneration fluid draw aspirator.

It is a further object to provide au auxiliary valve assembly of the aforedescribed character which is readily mounted in a water conditioning primary control valve without modification of the control valve.

The foregoing and other objects are realized is accord with the present invention by providing an auxiliary valve assembly which seats in the standard brine draw outlet port of a water conditioning system primary control valve and affords precise control of water flow to backwash as well as to the brine draw aspirator. The valve assembly is a dual function unit which is manually adjustable to give any desired rate of water flow to backwash and the brine draw and, accordingly, facilitate adapting the water conditioning system to variations in service line water pressure.

The invention, both as to its organization and method of operation, taken with further objects and advantages thereof, will best be understood by reference to the following description taken in connection with the accompanying drawings, in which:

FIGURE 1 is a top plan view of a water conditioning system primary control valve mounting an auxiliary valve assembly embodying features of the present invention mounted thereon;

FIGURE 2 is an enlarged sectional view taken along line 2—2 of FIGURE 1, with a portion of the water conditioning system shown diagrammatically therewith;

FIGURE 3 is an enlarged fragmentary view of the inner end of the auxiliary valve assembly;

FIGURE 4 is an enlarged fragmentary view of a core component in the auxiliary valve assembly embodying features of the present invention; and FIGURE 5 is a sectional view taken along line 5—5 of FIGURE 4.

Referring now to the drawings, and particularly to FIGURE 1, the primary control valve for a water conditioning system is illustrated generally at 10. The control valve 10 is normally effective to direct the flow of service water from an inlet port 11 through a water treatment tank (not shown) containing a suitable particulate material for removing hardness including calcium and magnesium ions, for example, from the water. The service water passes through the treatment tank and returns to the control valve 10 where it is re-introduced to service through the outlet port 12.

At the instance of a timing device (not shown) the valve 10 is effective to initiate regeneration of the particulate material by directing service water to a brine draw 15 (seen diagrammatically in FIGURE 2) and passing brine through the particulate material. Normally after regeneration the control valve 10, again at the instance of the timing device, conventionally initiates a backwash cycle wherein fresh water is passed in reverse through the water treatment tank to remove residual regeneration fluid and/or foreign material from the particulate material prior to re-introducing the tank to service.

If the pressure of service line water is relatively high, water is directed to the brine draw 15 and brine flows through the particulate material at a relatively high rate. The same can be said for the flow of backwash water. The flow rate may be so high, in fact, that regeneration is not effectively completed. To precisely control both the flow of water to the brine draw 15 and to backwash, an auxiliary valve assembly 20, embodying features of the present invention, is mounted in the standard brine draw outlet port 21 of the valve 10. The auxiliary valve assembly 20 is unitary in construction, yet affords separate manual control of both backwash water flow and regeneration fluid flow. As such, the auxiliary valve assembly 20 regulates the flow of service water from the transfer passage 25 in the valve housing 26 of the control valve 10, to the conventional brine aspirator nozzle 27 during the regeneration cycle. During the subsequent backwash cycle of the water conditioning system, the auxiliary valve assembly 20 regulates the flow of service water from the transfer passage 25 to the backwash passage 28 in the valve body 26.

The auxiliary valve assembly 20 embodying features of the present invention comprises a generally cylindrical molded plastic valve body 35 having a relatively large diameter outer section 36 and an inner section 37 of lesser diameter. The inner section 37 is externally threaded adjacent its juncture with the outer section 36, as at 40, for seating in internal threads 41 defined within the brine draw port 21. An O-ring 42 seated in an annular recess 43 between the threads 40 and the outer section 36 established a fluid tight seal between the valve body 35 and the housing 26 of the control valve 10.

Extending axially through the valve body 35 is a bore 48 which shall hereinafter be referred to as the major bore. A shoulder 49 defined in the major bore 48 separates it into a stepped outer bore section 50 and a cylindrical inner bore section 51. The inner bore section 51 extends through the inner body section 37 and opens into the transfer passage 28 and its terminus 55. An elongated port 56 in the side of the inner body section 37 is positioned to align with the backwash passage 28 when the valve body 35 is threaded tightly in place. In this light, the threads 40 and 41 are so arranged that alignment is assured.

Seated for rotation in the major bore 48 of the valve body 35 is a molded plastic valve core 60. The valve core 60 has a stepped core section 61 of a size and configuration designed to fit snugly in the outer bore section 50. External threads 62 formed on the periphery of the core section 61 mate with internal threads 63 formed in the outer bore section 50 to seat the core 60 in the bore 48 and provide means for adjusting the core 60 about its axis in the bore. To this end, a knurled head 64 is formed on the core 60 outside of the bore 48 for manually rotating the core. The core section 70 of the core 60 seats snugly in the inner bore section 51 of the bore 48 through the valve body 35, for rotation therein.

Extending through the core 60 is a bore 71 hereinafter referred to as the minor bore. A frusto conical valve seat 72 formed in the minor bore 71 defines a port 73 which separates the bore 71 into an inlet bore section 74 and an outlet bore section 75. The outlet bore section 75 is in communication with a chamber 76 defined between the major core section 61 and the bore 48 through a pair of apertures 80 formed in the core section 61. The chamber 76 is, in turn, in communication with the brine draw aspirator nozzle 27 through a transversely extending passage 81 in the valve body 35 and a suitable conduit 82 (shown diagrammatically). O-rings 85 and 86 seated in annular grooves 87 and 88 in the valve core section 61 seal the chamber 76 in fluid tight relationship from the remainder of the bore 48.

Mounted in the outlet bore section 75 through the core 60 is a needle valve pin 95 for varying the rate of water flow under pressure from the transfer passage 25 to the brine draw aspirator nozzle 27. The pin 95 comprises a needle end 96 of smaller diameter than the outlet bore section 75 so as to permit fluid flow along its length in the bore section 75 along its length. A conical tip 100 on the needle end 96 restricts or opens the port 73 to control the flow of water from the inlet bore section 74 to the outlet bore section 75 past the valve seat 72 when the needle valve pin 95 is rotated about its axis. To this end, internal threads 102 are formed in the outlet bore section 75 and external threads 103 are formed on the needle valve pin 95. A knurled head 104 facilitates manually turning the pin 95, and an O-ring 105 seated in a suitably formed annular recess 106 on the pin 95 provides a fluid tight seal to prevent water from reaching the threads 102, 103.

When the control valve 10 is manipulated by the timing device (not shown) to initiate regeneration, water under presure in the transfer passage 25 passes through the inlet bore section 74, the port 73 (past the valve seat 72), the outlet bore section 75, the apertures 80, chamber 76, and passages 81 and 82 to the brine draw aspirator nozzle 27. Brine drawn at the nozzle 27 is directed in a well known manner through the particulate material in a treatment tank (not shown). Precise control of the rate of brine flow is afforded, according to the present invention, by manipulating the needle valve pin through its control head 104 to position the needle tip 100 relative to the valve seat 72.

When the aforementioned timing device calls for initiation of the backwash cycle, water under pressure flows from the transfer passage 25 into the inlet bore section 74, thence through a triangular shaped port 110 in the wall 111 of the inlet bore section, and through the elongated aperture 56 in the valve body 35, to the backwash passage 28. The triangular aperture 110 is best seen in FIGURES 4 and 5. It extends circumferentially of the inlet bore section 74 in the valve core 60 for approximately 240°, starting at its apex 111 and terminating at its trailing edge 112. Diverging side edges 113 extend between the apex 111 and the trailing edge 112.

To provide structural support for the relatively thin walled inlet bore section 74 where the aperture 110 is cut out, a series of four ribs 116 are formed within the chamber 74 on its inner wall 117 and extend across the triangular shaped aperture. These ribs 116 are formed of plastic during the molding operation which forms the core 60. They are evenly spaced, permitting the free flow of water between them.

By rotating the core 60 about its longitudinal axis, it will be seen that a collective aperture of ever increasing size can be opened between the inlet bore section 74 and the backwash passage 28. As the core 60 is rotated in a counterclockwise direction, the aperture 110 passes over the aperture 56 from its apex 111 to its trailing edge 112. The collective opening defined by the apertures 56, 110 grows progressively larger.

The valve assembly 20 is readily mounted in the housing 26 of the control valve 10 without modification. The valve assembly 20 provides precise control of water flow axially out of the port 21 to the brine draw 15, while also providing precise control of water flow in the valve housing 26 between the passages 25 and 28. Control of both functions is afforded in a unitary valve assembly 20 which is simple and compact. The ease with which the flow rate and, accordingly, the effectiveness of regeneration and backwash, can be effected is obvious.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. In a water conditioning system having a primary valve which controls service and regeneration and includes a brine draw water outlet port, a backwash water delivery passage, and a water supply passage, an auxiliary valve assembly for regulating the flow of water to brine draw and to backwash, comprising: a valve body adapted to be mounted in the outlet port, a major valve bore extending through said body and opening adjacent one end into the water supply passage, a valve core mounted in the other end of said major valve bore and rotatable therein, a minor valve bore extending through said valve core and separated into inlet bore means and outlet bore means by a valve port, said inlet bore means opening into the water supply passage, brine draw water outlet passage means extending radially through said valve core and said valve body from said outlet bore means, a valve member mounted in said outlet bore means for axial movement therein to open and close said valve port and vary the rate of water flow from the water supply passage to the brine draw, first aperture means extending radially through said valve body in registry with the backwash water delivery passage, and second aperture means extending radially through said valve core to said inlet bore means in axial alignment with said first aperture means, the rotation of said valve core in said major valve bore varying the amount of registry of said first and second apertures to vary the rate of water flow from said inlet bore means to the backwash delivery passage.

2. The auxiliary valve assembly of claim 1 further characterized in that said valve member comprises a needle member threaded into said minor valve bore, a valve seat encircling said valve port, said needle member having tip means adapted to engage said valve seat.

3. The auxiliary valve assembly of claim 1 further characterized in that said first aperture is axially elongated, said second aperture comprising a triangular shaped opening having a leading apex and trailing edge connected by diverging edges.

4. The auxiliary valve assembly of claim 3 further characterized by and including axially disposed rib means in said inlet bore means for supporting said major valve bore in the vicinity of said second aperture means.

5. The auxiliary valve assembly of claim 4 further characterized in that said rib means includes a plurality of supporting ribs extending across said second aperture.

6. In a water conditioning system having a primary valve which controls service and regeneration and includes a brine draw outlet port, a backwash water delivery passage, and a water supply passage, an auxiliary valve assembly for regulating the flow of water to brine draw and to backwash, comprising: a valve body adapted to be mounted in the outlet port, a major valve bore extending through said body and opening adjacent one end into the water supply passage, a valve core rotatably mounted in the other end of said major bore and having manual control means extending outwardly thereof, a minor valve bore extending through said valve core and separated into inlet bore means and outlet bore means by a valve port, said inlet bore means opening into the water supply passage, brine draw water outlet passage means extending radially through said valve core and said valve body from said outlet bore means, a valve member rotatably mounted in said outlet bore means for axial movement therein to open and close said valve port and vary the rate of water flow from the water supply passage to the brine draw, said valve member including manual control means extending outwardly of said outlet bore means, first axially disposed aperture means extending radially through said valve body in registry with the backwash water delivery passage, and second aperture means extending radially through said valve core to said inlet bore means in axial alignment with said first aperture means, said second aperture means comprising a triangular shaped opening having a leading apex and a trailing edge connected by diverging edges.

7. The auxiliary valve assembly of claim 6 further characterized by and including a plurality of ribs formed in said inlet bore means for supporting said valve core, said plurality of ribs extending across said first aperture.

8. The auxiliary valve assembly of claim 7 further characterized in that said brine draw water outlet passage means includes a radially disposed opening in said valve core connecting said outlet bore means with a chamber defined between said valve core and said valve body, and an outlet passage extending from said chamber through said valve body.

9. A valve arrangement for controlling service and regeneration in a water conditioning system, comprising: a primary valve having a brine draw water outlet port, a backwash water delivery passage in said primary valve, a water supply passage in said primary valve, an auxiliary valve assembly for regulating the flow of water to brine draw into backwash seated in said brine draw water outlet port, said auxiliary valve assembly including a valve body, a major valve bore extending through said body and opening adjacent one end into said water supply passage, a valve core mounted in the other end of said major bore and rotatable therein, a minor valve bore extending through said valve core and separated into inlet bore means and outlet bore means by a valve port, said inlet bore means opening into said water supply passage, brine draw water outlet passage means extending radially through said valve core and said valve body from said outlet bore means, a valve member rotatably mounted in said outlet bore means for axial movement therein to open and close said port and vary the rate of water flow from said water supply passage to the brine draw, first aperture means extending radially through said valve body in registry with said backwash water delivery passage, and second aperture means extending radially through said valve core to said inlet bore means in axial alignment with said first aperture means, rotation of said valve core in said major bore varying the amount of registry of said first and second apertures to vary the flow rate of water from said inlet bore means to said backwash water delivery passage.

10. The valve arrangement of claim 9 further characterized in that said first aperture means comprises an axially elongated opening through said valve, said second aperture comprising a triangular shaped opening having a leading apex and trailing edge connected by diverging edges.

11. The valve arrangement of claim 10 further characterized by and including supporting rib means formed in said inlet bore means for strengthening said valve core, said rib means including a plurality of ribs extending across said second aperture in spaced relationship.

References Cited by the Examiner

UNITED STATES PATENTS

| 2,791,236 | 5/1957 | Mauer | 137—608 |
| 3,117,587 | 1/1964 | Wilbinger | 137—608 X |
| 3,138,553 | 6/1964 | Mollring | 210—191 X |

FOREIGN PATENTS

| 619,246 | 3/1961 | Italy. |

ALAN COHAN, *Primary Examiner.*

C. GORDON, *Examiner.*